US009353871B2

(12) United States Patent
Hoang et al.

(10) Patent No.: US 9,353,871 B2
(45) Date of Patent: May 31, 2016

(54) CLOSE ONLY EXPANSIVE GATE VALVE

(71) Applicant: Cameron International Corporation, Houston, TX (US)

(72) Inventors: Loc Gia Hoang, Houston, TX (US); Kevin Reuter, Houston, TX (US)

(73) Assignee: Cameron International Corporation, Houston, TX (US)

( * ) Notice: Subject to any disclaimer, the term of this patent is extended or adjusted under 35 U.S.C. 154(b) by 129 days.

(21) Appl. No.: 14/145,066

(22) Filed: Dec. 31, 2013

(65) Prior Publication Data
US 2015/0184758 A1 Jul. 2, 2015

(51) Int. Cl.
*F16K 3/14* (2006.01)
*F16K 3/02* (2006.01)
*F16K 3/18* (2006.01)

(52) U.S. Cl.
CPC . *F16K 3/14* (2013.01); *F16K 3/029* (2013.01); *F16K 3/186* (2013.01)

(58) Field of Classification Search
CPC ............ F16K 3/14; F16K 3/029; F16K 3/186
USPC ........................... 251/203, 196, 167, 327–328
See application file for complete search history.

(56) References Cited

U.S. PATENT DOCUMENTS

| | | | |
|---|---|---|---|
| 3,051,434 A | 8/1962 | Gulick | |
| 3,068,901 A * | 12/1962 | Anderson | F16K 3/186 251/328 |
| 4,116,419 A * | 9/1978 | Diehl et al. | 251/196 |
| 4,188,016 A * | 2/1980 | Whaley | 251/328 |
| 4,189,127 A * | 2/1980 | Constantino | 251/196 |
| 4,246,928 A * | 1/1981 | Burns et al. | 137/315.32 |
| 4,279,404 A * | 7/1981 | Levin | F16K 3/186 251/167 |
| 4,291,862 A | 9/1981 | Alvarez et al. | |
| 4,341,369 A * | 7/1982 | Meyer | 251/168 |
| 4,489,918 A * | 12/1984 | Kalsi | 251/328 |
| 4,515,174 A | 5/1985 | Hollister et al. | |
| 4,566,671 A * | 1/1986 | Beson | F16K 3/207 251/159 |
| 5,211,373 A * | 5/1993 | Baker | F16K 3/186 251/196 |
| 5,232,199 A * | 8/1993 | Thrasher | 251/196 |
| 5,722,636 A * | 3/1998 | Houston | F16K 3/14 251/167 |

FOREIGN PATENT DOCUMENTS

| | | |
|---|---|---|
| GB | 390711 A | 4/1933 |
| JP | H02138577 A | 5/1990 |
| WO | 2013049643 A1 | 4/2013 |

OTHER PUBLICATIONS

PCT ISR & WO for PCT/US2014/066675, mailed Feb. 27, 2015.

\* cited by examiner

*Primary Examiner* — John Bastianelli
(74) *Attorney, Agent, or Firm* — Fletcher Yoder P.C.

(57) ABSTRACT

A system, including a first flow control element configured to couple to a stem, and a second flow control element coupled to the first flow control element, wherein the first and second flow control elements are configured to expand relative to one another to create a seal in a closed position between a chamber and a flow path in a valve body, and wherein the first and second flow control elements are configured to enable fluid flow between the chamber and the flow path in an open position.

23 Claims, 4 Drawing Sheets

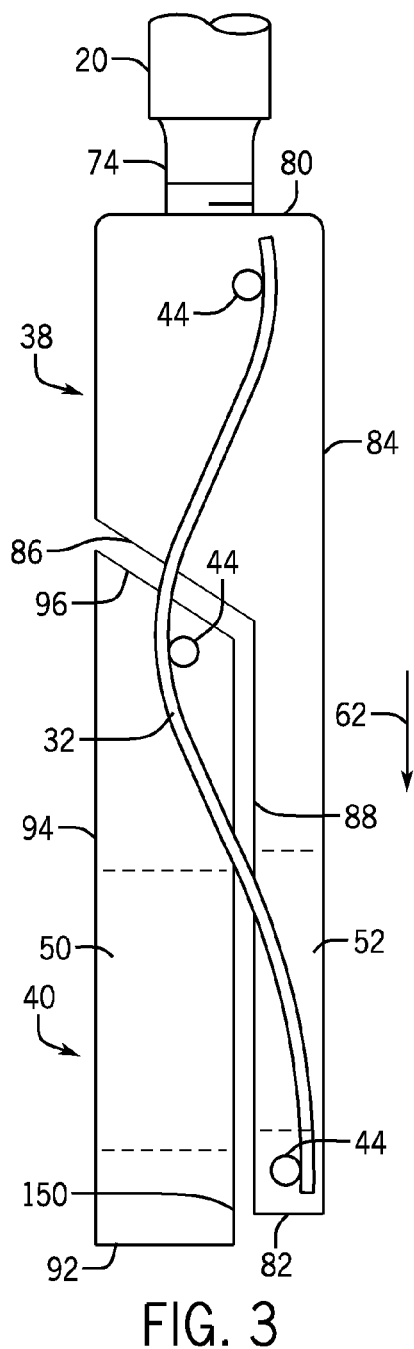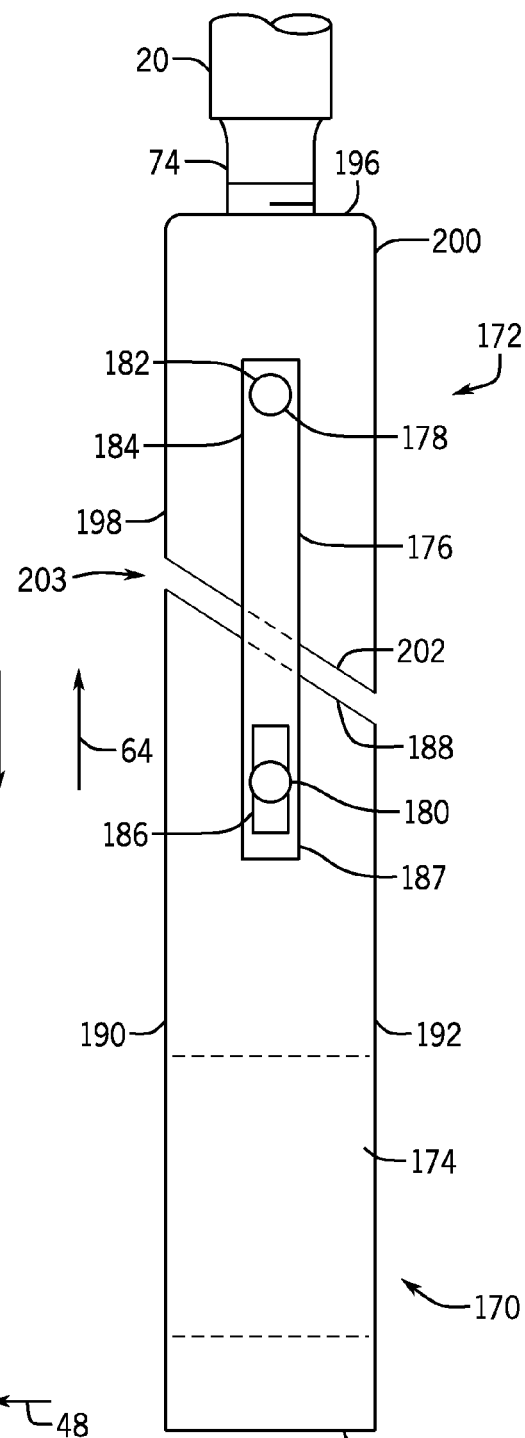

CLOSE ONLY EXPANSIVE GATE VALVE

FIELD OF INVENTION

The present invention relates to a gate valve.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Valves are used in a variety of applications to manage and transmit flows of materials. Valves generally include an open position that enables fluid flow through a primary flow path and a closed position that reduces or completely shuts off that flow path. However, when transporting a hot process fluid, for example, over-pressurization of a valve due to thermal expansion of fluids not in the flow path may result in undesirable wear and/or reduction in the useful life of the valve.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 3 is a side view of a first flow control element and a second flow control element according to an embodiment;

FIG. 4 is a side view of a first flow control element and a second flow control element according to an embodiment.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The disclosed embodiments include a gate valve capable of controlling the flow of a hot process fluid through a system while blocking over-pressurization of a fluid (e.g. lubricant, stranded process fluid, etc.) within a cavity of the gate valve. As described below, the gate valve may include first and second flow control elements that transition between open and closed positions to enable or block fluid flow through the gate valve. In a closed position, the flow control elements may form a fluid tight seal with one or more valve seats in a valve body, which blocks the flow of the hot process fluid through the gate valve. However, in an open position, the gate valve prevents the first and second flow control elements from forming a fluid tight seal with one or more valve seats. Accordingly, in an open position, the gate valve enables fluid to ingress and egress from the cavity in the gate valve body in addition to enabling fluid flow through the gate valve. In other words, as the hot process fluid flows through the gate valve, the hot process fluid heats and increases the pressure of the fluid in the cavity, but the fluid may escape from the cavity and enter the main flow path of the hot process fluid, because the first and second flow control elements selectively do not form a fluid tight seal with the one or more valve seats in the open position.

Figure 1:
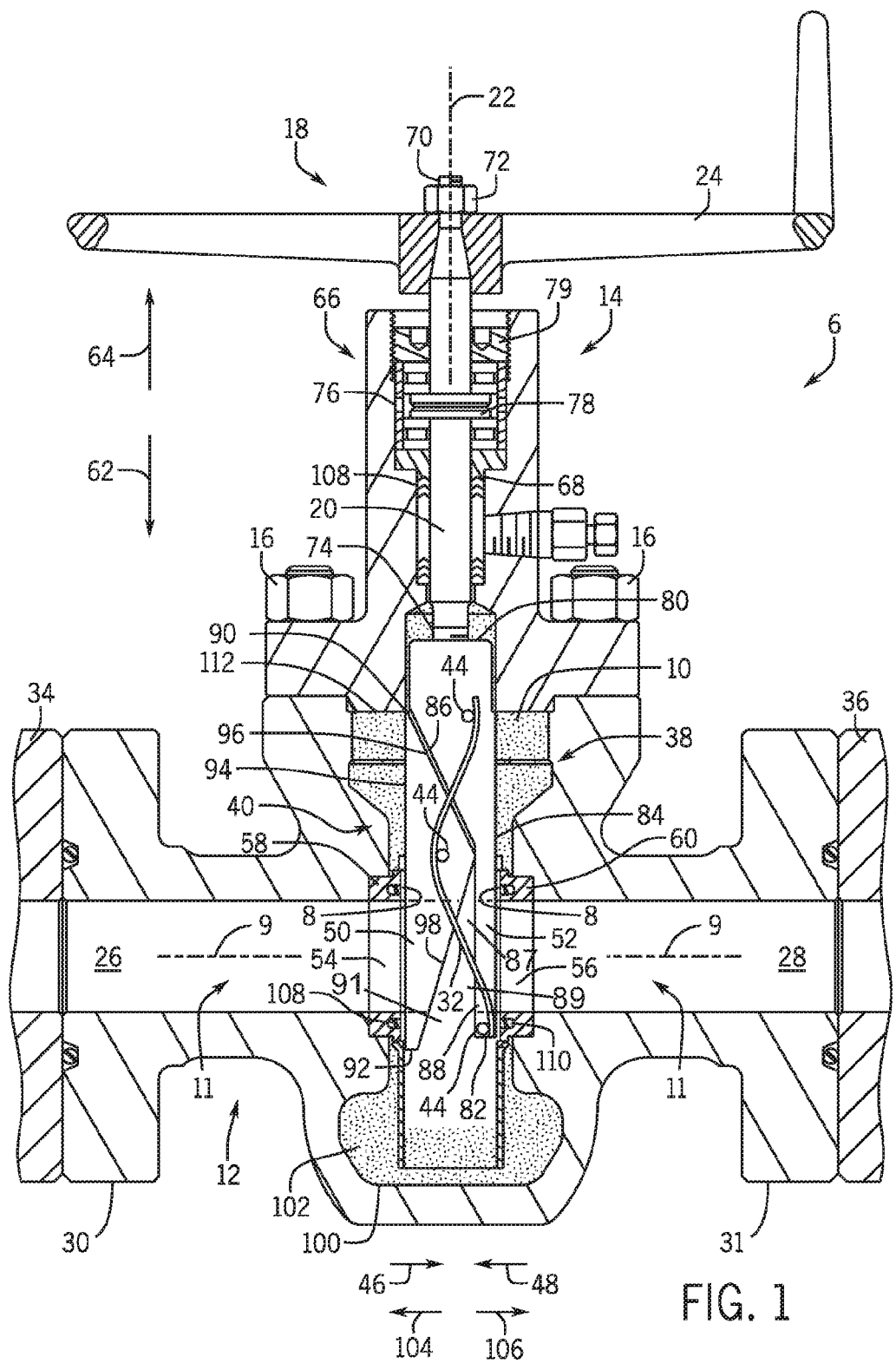
FIG. 1 is a partial cross-sectional side view of a gate valve in an open position according to an embodiment.

FIG. 1 is a cross-sectional view of a gate valve 6 in the open position, allowing fluid flow therethrough. However, in this open position (e.g., non-sealing position), the gate valve 6 has gaps 8 that enable the ingress and egress of fluid (e.g., hot fluid, lubricant) from a cavity 10 in a valve body 12 that, as illustrated, is coupled to a valve bonnet 14 via one or more bolts 16. An actuator assembly 18, as described below, may be used to move a valve stem 20 along a central axis 22 to actuate the gate valve 6 between open and closed positions (e.g., sealing and non-sealing positions). In a closed position, the gate valve 6 blocks the flow of a hot process fluid with a fluid tight seal. In an open position, a hot process fluid freely flows through the gate valve 6. However, the flow of hot process fluid through the gate valve 6 may heat a fluid (e.g., a lubricant, stranded hot process fluid, etc.) within the cavity 10. Accordingly, because the gate valve 6 does not form a fluid tight seal in the open position relative to the cavity 10, the gate valve 6 enables the pressurized fluid in the cavity 10 to escape into an inlet passage 26 and/or the outlet passage 28. This reduces the likelihood, for example, of over-pressurization of the fluid in the cavity due to thermal expansion of that fluid caused by the hot fluid flow in the gate valve.

As illustrated, the gate valve 6 includes the inlet passage 26 and the outlet passage 28 with respective flanges 30 and 31 to provide connections to piping or other components. For example, the gate valve 6 may be placed between an upstream pipe 34 transporting a hot process fluid from a source and a downstream pipe 36 transporting the hot process fluid to downstream equipment. In such an embodiment, the gate valve 6 may be used in an on/off manner to allow or block flow from the upstream pipe 34 through the gate valve 6 and into the downstream pipe 36. In other embodiments, the gate valve 6 may be used to regulate (e.g., choke) flow from the upstream pipe 34 into the downstream pipe 36.

As explained above, the gate valve 6 includes a valve stem 20 (e.g., an elongated rod). The valve stem 20 couples to a first flow control element 38. For example, the valve stem 20 may couple to the first flow control element 38 via threading. However, in other embodiments, the first flow control element 38 may attach to the valve stem 20 using other connection joints, such as T-slots, pins, lift nuts, bolts, clamps, welds, and so forth. As illustrated, a second flow control element 40 couples to the first flow control element 38 with a rod or wire 32 that weaves between pins 44 on the first and second flow control elements 38, 40. As illustrated, the rod or wire 32 exerts a collapsing force on the pins 44 in directions 46 and 48 that clamps the second flow control element 40 to the first flow control element 38. In other words, the rod or wire 32 operates like a tensioned spring, cam, or guide to draw the first and second flow control elements 38, 40 together. In some embodiments, the rod or wire 32 may be non-linear or have a curved profile.

The first and second flow control elements 38 and 40 include respective ports 50 and 52 that selectively allow a hot process fluid to flow through the valve body 12, when the first and second flow control elements 38 and 40 are in an open position. In particular, the ports 50 and 52 are openings through the respective second flow control element 38 and the first flow control element 40. In FIG. 1, the first and second flow control elements 38, 40 are in an open position, so the ports 50 and 52 generally align with openings 54 and 56 within an inlet seat 58 and an outlet seat 60, respectively, to open the passage 11 along axis 9. By moving the first and second flow control elements 38, 40 axially in directions 62 and 64 along the central axis 22, the ports 50 and 52 align or misalign with the openings 54 and 56 in the inlet seat 58 and the outlet seat 60, which enables or blocks the flow of the hot process fluid through the valve body 12 of the gate valve 6. It should be appreciated that the gate valve 6 may be bi-directional, and the terms "inlet" and "outlet" are used for ease of reference and do not describe any specific directional limitation of the gate valve 6. For example, the seats 42, 44 may be either inlet or outlet seats, respectively.

As described above with respect to FIG. 1, the gate valve 6 may include an actuator assembly 18 that opens and closes the gate valve 6 by moving the first and second flow control elements 38, 40. The actuator assembly 18 may include the stem 20, hand wheel 24 (e.g., manual actuator), and bearing assembly 66. In some embodiments, the actuator assembly 18 may include a powered drive system, such as a hydraulic or electric drive system, for automatic actuation. As illustrated, the stem 20 extends through an aperture 68 in the bonnet 14. This enables the stem 20 to couple to the hand wheel 24 (e.g., actuator) and to the first flow control element 38. More specifically, the hand wheel 24 couples to a first threaded end portion 70 of the stem 20 with a nut 72, while a second threaded end portion 74 threadingly couples to the first flow control element 38. In operation, an operator opens and closes the gate valve 6 by rotating the hand wheel 24 (e.g., manual actuator) or engaging a powered drive system to thread the second threaded end portion 74 in and out of the first flow control element 38. As the stem 20 threads into the first flow control element 38, the gate valve 6 opens as the first flow control element 38 moves in axial direction 64. Similarly, when the stem 20 threads out of the first flow control element 38, the gate valve 6 closes as the flow control element 38 moves in axial direction 62. The bearing assembly 66 facilitates rotation of the stem 20 by surrounding and aligning the stem 20 in the passageway 68. In some embodiments, the bearing assembly 66 rests within a counterbore 76 and surrounds a flange 78 on the stem 20. The gate valve 6 retains the bearing assembly 66 and stem 20 within the bonnet 14 with a threaded nut 79 that threads into the counterbore 76.

As explained above, the first and second flow control elements 38, 40 form a fluid tight seal in a closed position but block or prevent fluid tight sealing in an open position. Accordingly, in an open position, the gate valve 6 enables a fluid to ingress or egress from the cavity 10 by passing between the first and second flow control elements 38, 40 and the inlet seat 58 and the outlet seat 60. The first and second flow control elements 38, 40 include multiple surfaces. These surfaces enable sealing against the inlet seat 58 and the outlet seat 60 in a closed position, but block or prevent sealing against the inlet seat 58 and the outlet seat 60 in an open position. For example, the first flow control element 38 may include a top surface 80, a bottom surface 82, a seat contact surface 84, an angled contact surface 86, and a flat contact surface 88. The second flow control element 40 may include a top surface 90, a bottom surface 92, a seat contact surface 94, a first angled contact surface 96, and a second angled surface 98. As explained above, the actuator assembly 18 moves the first and second flow control elements 38, 40 between open and closed positions by threading the stem 20 into and out of the first flow control element 38.

Figure 2:
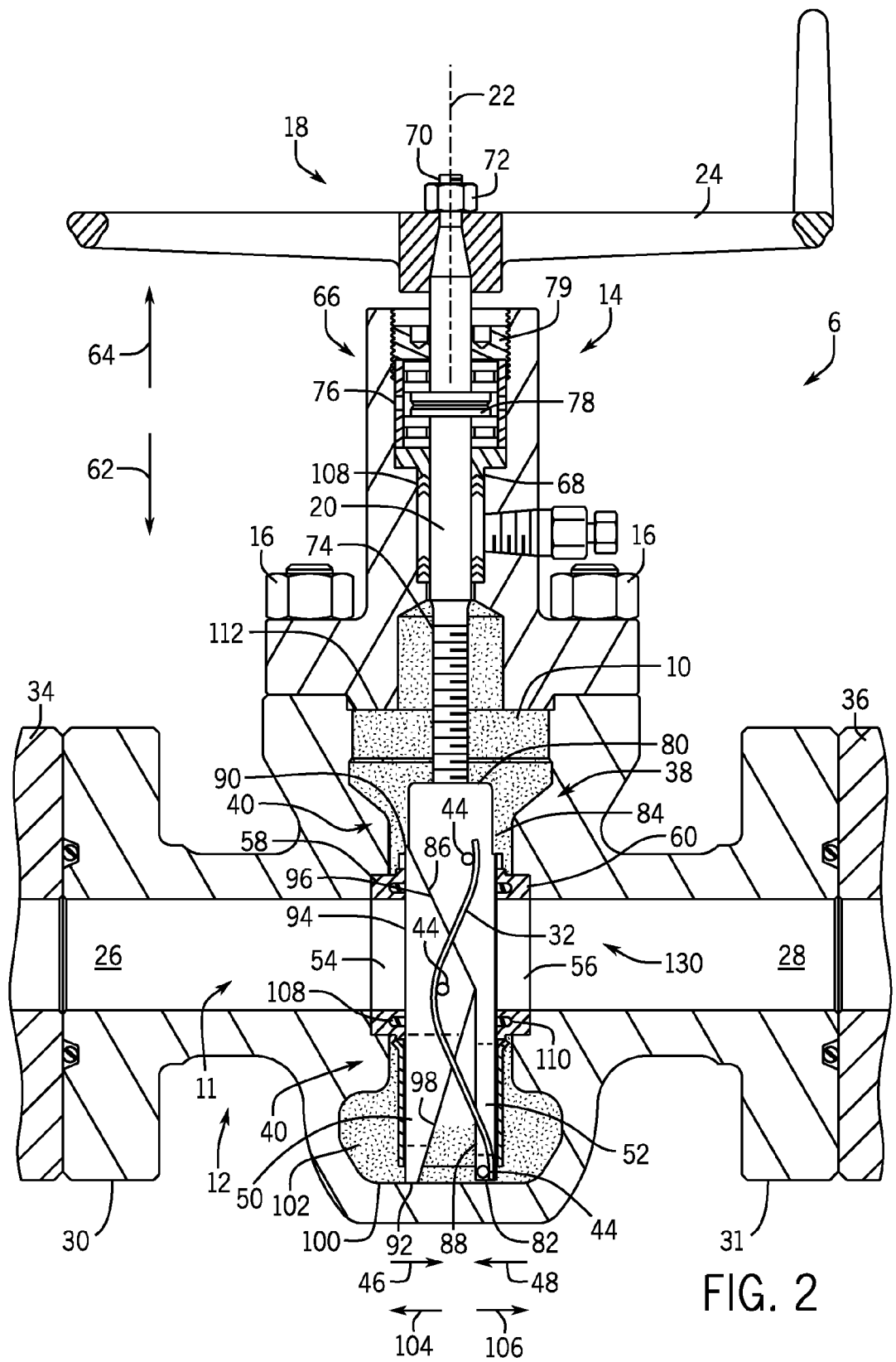
FIG. 2 is a partial cross-sectional side view of a gate valve in a closed position according to an embodiment.

As the stem 20 threads out of the first flow control element 38, the stem 20 drives the first flow control element 38 in axial direction 62. As the first flow control element 38 moves in direction 62, the angled contact surface 86 of the first flow control element 38 contacts the first angled contact surface 96 of the second flow control element 40, the contact between the two surfaces moves the second flow control element 40 in direction 62. As the stem 20 continues to thread out of the first flow control element 38, the first and second flow control elements 38, 40 will continue to move in direction 62 misaligning the apertures 50 and 52 of the first and second flow control elements 38, 40 with the apertures 54 and 56 in the inlet and outlet seats 58, 60, as shown in FIG. 2. The misalignment blocks flow through the gate valve 6, but may not form a fluid tight seal. More specifically, as the second flow control element 40 continues to move in axial direction 62, the bottom surface 92 contacts a bottom surface 100 in a cavity 102 in the valve body 12. The bottom surface 100 blocks axial movement of the second flow control element 50 in direction 62. However, because the first flow control element 38 has not contacted the bottom surface 100, the first flow control element 38 continues to move in axial direction 38. As the first flow control element 38 moves in direction 62, the angled contact surface 86 slides against the first angled contact surface 96 of the second flow control element 40. The movement of the angled contact surface 86 along the first angled contact surface 96 forces the first and second flow control elements 38, 40 outward in axially opposite directions 104 and 106 against the respective inlet seat 58 and the outlet seat 60, as shown in FIG. 2. The force of the first and second flow control elements 38, 40 against the inlet seat and outlet seat 58, 60 forms fluid tight seals with the inlet and outlets seats 58, 60 and/or gaskets 108 and 110 in the inlet and outlet seats 58, 60. In the closed position, fluid is unable to escape from or enter into the cavity 10.

In order to open the gate valve 6, the stem 20 rotates in an opposite direction, thereby threading into the first flow control element 38. As the stem 20 threads into the first flow control element 38, the first flow control element 38 moves axially in direction 64 towards the bonnet 14. The movement of the first flow control element 38 in direction 64 enables the angled contact surface 86 to slide along the first angled contact surface 96, removing the axial outward force of the first and second flow control elements 38, 40 against the inlet and outlet seats 58, 60. More specifically, as first and second flow control elements 38, 40 move into an open position, the rod or wire 42 compresses the angled surfaces 72 and 82 inwardly against each other in directions 46 and 48 (e.g., the first and second flow control elements 38, 40 retract from the previously expanded position). As the first and second flow control elements 38, 40 continue to move in axial direction 64, the inlet and outlet seat contact surfaces 94 and 84 slide past the inlet and outlet seats 58, 60 aligning apertures 50 and 52 of the first and second flow control elements 38, 40 with the apertures 50, 52 in the inlet and outlet seats 58, 60, as shown in FIG. 1. In the open position of FIG. 1, the surfaces of the first and second flow control elements 38, 40 do not form fluid tight seals with the inlet and outlets seats 58, 60. More specifically, as the stem 20 continues to thread into the first flow control element 38, the top surface 90 of the second flow control element 40 contacts a face 112 of the bonnet 14. Contact between the top surface 90 blocks further movement of the second flow control element 40 in direction 64. However, as the first flow control element 38 continues to move in direction 64, the second angled surface 98 slides over the flat contact surface 88 of the first flow control element 38. As illustrated, the surfaces 88, 98 diverge away from one another at an acute angle 87, thereby defining a spaced portion or diverging portion 89 with an expanding space 91 between surfaces 88, 98 of the first and second flow control elements 38, 40. In other words, the second angled surface 98 on the second flow control element 40 does not contact an angled surface on the first flow control element 38 that would force the first and second flow control elements 38, 40 axially outward in directions 104 and 106. Accordingly, because the first and second flow control elements 38, 40 do not move axially outward when the second flow control element 40 contacts the bonnet 14, the first and second flow control elements 38, 40 do not form fluid tight seals with the inlet and outlets seats 58, 60, in an open position as shown in FIG. 1. Thus, a fluid, such as a fluid heated by the heated process fluid passing through the gate valve 6, may escape the cavity 10 through the gaps 8 between the inlet contact surface 94 and the inlet seat 58; and between the outlet contact surface 84 and the outlet seat 60. By enabling pressurized fluid to escape the cavity 10, the gate valve 6 blocks over-pressurization of the seals 108 and the bearing assembly 66.

FIG. 2 is a cross-sectional view of a gate valve 6 in a closed position forming a fluid tight seal 130. As explained above, in the closed position, the bottom surface 92 of the second flow control element 40 contacts the bottom surface 100 of the cavity 102 in the valve body 12. The bottom surface 100 stops axial movement of the second flow control element 50 in direction 62, but not the first flow control element 38. The first flow control element 38 can still move in axial direction 38 as the angled contact surface 86 slides against the first angled contact surface 96 of the second flow control element 40. However, the movement of the angled contact surface 86 (e.g., energizing taper, wedge surface, cam surface) along the first angled contact surface 96 (e.g., energizing taper, wedge surface, cam surface) forces (e.g., wedges, cams, energizes) the first and second flow control elements 38, 40 axially outward in axially opposite directions 104 and 106 against the respective inlet seat 58 and the outlet seat 60. More specifically, the movement of the angled contact surface 86 along the first angled contact surface 96 enables the first and second flow control elements 38, 40 to overcome the compressive force of the rod or wire 32. As the first and second flow control elements 38, 40 move axially outward fluid tight seals 130 form between the first and second flow control elements 38, 40 and the inlet and outlets seats 58, 60 and/or gaskets 108 and 110 in the inlet and outlet seats 58, 60. In the closed position, fluid is unable to escape from or enter into the cavity 10.

FIG. 3 is a side view of a first flow control element 38 and a second flow control element 40 according to an embodiment. The first and second flow control elements 38, 40 in FIG. 3 may be used in the valve 6 shown in FIGS. 1 and 2. As illustrated, the first flow control element 38 is the same as the flow control element 38 in FIGS. 1 and 2. However, in FIG. 3, the second flow control element 40 differs from the flow second flow control element 40 in FIGS. 1 and 2. Specifically, the second flow control element 40 in FIG. 3 includes a flat contact surface 150 instead of the second angled surface 98 in the second flow control element 40 of FIGS. 1 and 2. Accordingly, as the gate valve 6 transitions into an open position, the wire or rod 32 compresses the flat contact surface 150 and the angled contact surface 96 of the second flow control element 40 against the respective flat contact surface 88 and the angled contact surface 86 of the first flow control element 38, which forms space between the first and/or second flow control elements 38, 40 and the inlet and outlet seats 58, 60.

FIG. 4 is a side view of a first flow control element 170 and a second flow control element 172 according to an embodiment. The first and second flow control elements 170, 172 are interchangeable with the first and second flow control elements 38, 40 in FIGS. 1 and 2. As illustrated, the first flow control element 170 includes an aperture 174. In an open position, such as shown in FIG. 1, the aperture 174 aligns with the apertures 54, 56 in the inlet and outlet seats 58, 60 to enable a hot process fluid to flow through the gate valve 6. However, in a closed position such as shown in FIG. 2, the first flow control element 170 blocks the fluid flow through the gate valve 6. The first and second flow control elements 170, 172 couple together with a connector bar 176 coupled to pins 178 and 180, which couple to respective flow control elements 172 and 170. Specifically, the connector bar 176 includes an aperture 182 (e.g., circular aperture) in a first end 184 and another aperture 186 (e.g., elongated aperture or slot) in a second end 187. The apertures 182 and 186 enable the connector bar 176 to couple to the respective pins 178 and 180, which couples the first flow control element 170 to the second flow control element 172.

The first flow control element 170 includes multiple surfaces that enable sealing against the inlet seat 58 and for engaging the second flow control element 172. For example, the first flow control element 170 may include a top angled surface 188, an inlet contact surface 190, a rear surface 192, and a bottom surface 194. The second flow control element 172 may include a top surface 196, a front surface 198, an outlet contact surface 200, and a bottom angled surface 202. In operation, the actuator assembly 18 moves the first and second flow control elements 170, 172 between open and closed positions. Specifically, as the stem 20 threads out of the second flow control element 172, the second flow control element 172 moves in direction 62. As the stem 20 continues to thread out of the second flow control element 172, the first and second flow control elements 170 and 172 will continue to move in direction 62, which misaligns the aperture 174 with the inlet seat 58 and outlet seat 60. The misalignment blocks flow through the gate valve 6, but may not form a fluid tight seal. As the second flow control element 172 continues to move in axial direction 62, the bottom surface 194 of the first flow control element 170 will contact a bottom surface 100 of cavity 102 (seen in FIGS. 1 and 2), which blocks further axial movement. When the first flow control element 170 contacts the bottom surface 100, the first flow control element 170 stops moving in direction 62, but not the second flow control element 172. As the second flow control element 172 continues to move in axial direction 62, the pin 180 slides within the aperture 186 of the connector bar 176 enabling the bottom angled surface 202 to contact and slide along the top angled surface 188 of the first flow control element 170. As the angled contact surfaces 188 and 202 slide against and along each other, the surfaces 188 and 202 force the first and second flow control elements 170, 172 axially outward in direction 104 and 106. This forces the first flow control element 170 into contact with the inlet seat 58 forming a fluid tight seal that blocks fluid flow through the gate valve 6. However, because the second flow control element 172 does not overlap the rear surface 192 of the first flow control element 170, the second flow control element 172 may contact, but does not form a fluid tight seal with the outlet seat 60.

The gate valve 6 opens as the stem 20 threads into the second flow control element 172. The movement of the second flow control element 172 in direction 64 enables the bottom angled surface 202 to slide along the top angled surface 188, removing the axial outward force of the first and second flow control elements 170, 172 against the inlet and outlet seats 58, 60. As the second flow control element 170 continues to move in axial direction 64, the bottom angled surface 202 of the second flow control element 172 may separate from the top angled surface 188 of the first flow control element 170 to open an intermediate gap 203. As explained above, the connector bar 176 couples the first and second flow control elements 170, 172. Accordingly, as the second flow control element 172 moves in axial direction 64, the connector bar 176 moves the first flow control element 172 into an open position (i.e., aligning the aperture 174 with the aperture 54 in the inlet seat 58). In the open position, the surfaces of the first and second flow control elements 170, 172 do not form fluid tight seals with the inlet and outlets seats 58, 60 enabling a fluid in the cavity 10 to escape by passing between the front surface 190 and the inlet seat 58; and between the rear surface 192 and the outlet seat 60. Accordingly, the gate valve 6 blocks overpressurization of the seals 108 and the bearing assembly 66.

Figure 5:
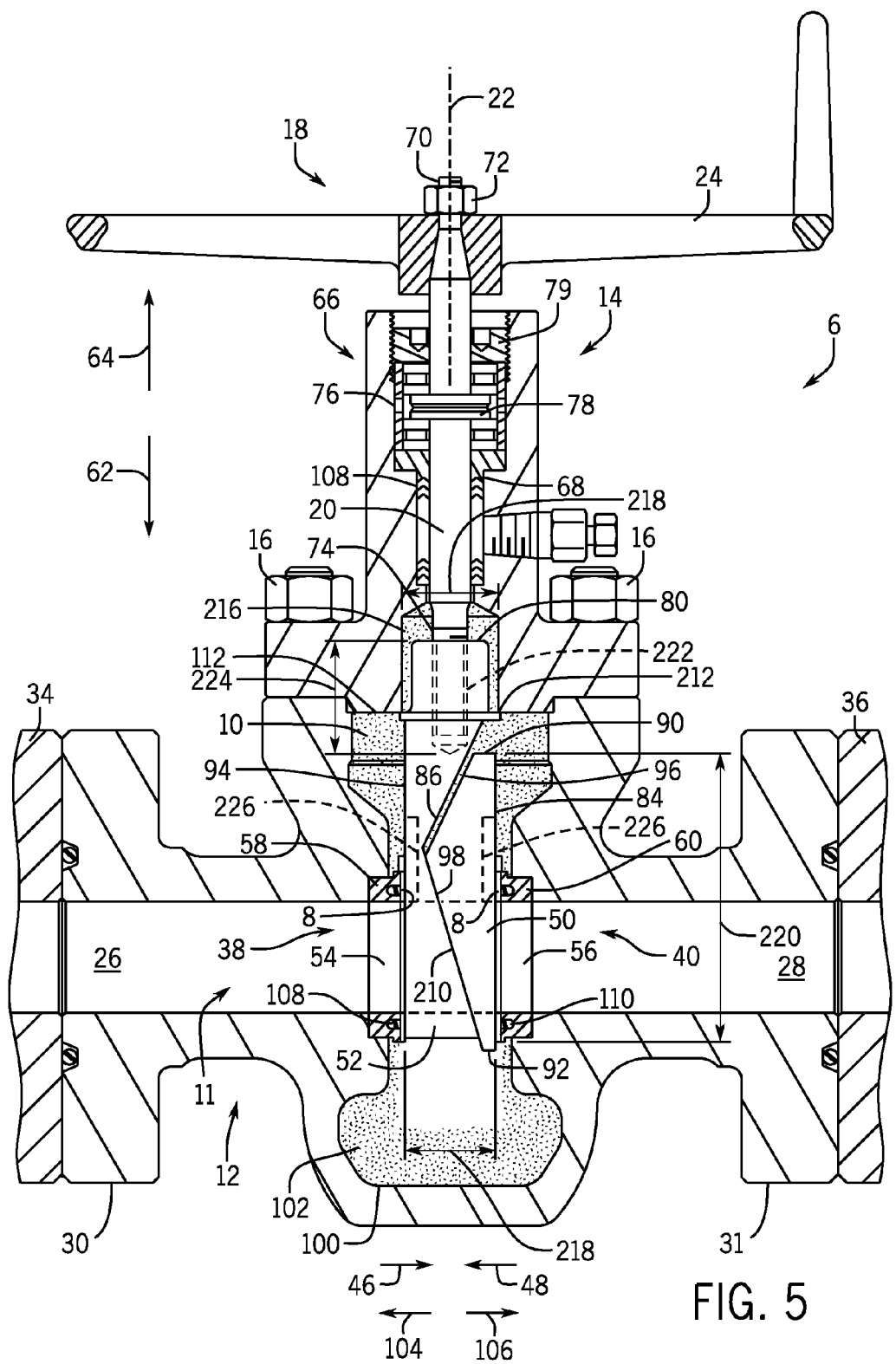
FIG. 5 is a partial cross-sectional side view of a gate valve in an open position according to an embodiment.

FIG. 5 is a cross-sectional side view of the gate valve 6 with the first and second flow control elements 38, 40 in an open position. In FIG. 5, the first and second flow control elements 38, 40 are reversed with the first flow control element next to the inlet seat 58 and the second flow control element 40 next to the outlet seat 60. More specifically, the seat contact surface 84 of the first flow control element 38 contacts and seals with the inlet seat 58 in a closed position, while the sealing surface 94 of the second flow control element 40 seals with the outlet seat 60. As explained above in FIGS. 1 and 2, in the closed position the bottom surface 92 of the second flow control element 40 contacts the bottom surface 100 of the cavity 102. The bottom surface 100 stops axial movement of the second flow control element 40 in direction 62, but not the first flow control element 38. The first flow control element 38 can still move in axial direction 38 as the angled contact surface 86 (e.g., energizing taper, wedge surface, cam surface) slides against the first angled contact surface 96 (e.g., energizing taper, wedge surface, cam surface) of the second flow control element 40. The movement of the angled contact surface 86 along the first angled contact surface 96 forces (e.g., wedges, cams, energizes) the first and second flow control elements 38, 40 axially outward against the respective inlet seat 58 and the outlet seat 60. The force of the first and second flow control elements 38, 40 against the inlet seat and outlet seat 58, 60 forms fluid tight seals with the inlet and outlets seats 58, 60 and/or gaskets 108 and 110 in the inlet and outlet seats 58, 60. In the closed position, fluid is unable to escape from or enter into the cavity 10.

However, the first flow control elements 38 in FIG. 5 differs from the first flow control element 38 in FIGS. 1 and 2. Specifically, the first flow control element 40 in FIG. 5 includes an angled contact surface 210 and a flange 212. In operation, as the stem 20 threads into the first flow control element 38, the first flow control element 38 moves axially in direction 64 towards the bonnet 14. The movement of the first flow control element 38 in direction 64 enables the angled contact surface 86 to slide over the first angled contact surface 96, which reduces the axial outward force of the first and second flow control elements 38, 40 against the inlet and outlet seats 58, 60. Furthermore, as the first flow control element 38 moves in direction 64, the angled contact surface 210 contacts the second angled surface 98, which moves the second flow control element 40 in direction 64. Accordingly, the gate valve 6 may not include a rod or wire 32 or pins 44 that couple the first and second flow control elements together. The first flow control element 38 may continue to move in direction 64 until the flange 212 contacts the face 112 of the bonnet 14. Without the flange 212, the top surface 90 of the second flow control element 40 would contact the surface 112 of the bonnet 14 enabling the angled contact surface 210 of the first flow control element 38 to contact the second angled surface 98 of the second flow control element 40 forcing the first and second flow control elements 38, 40 axially outward in directions 104 and 106. As the first and second flow control elements 38, 40 slide past each other in axial directions 104 and 106, the flow control elements 38 and 40 would form a fluid tight seal with the inlet and outlet seats 58 and 60 in an open position without the flange 212. As explained above, a fluid tight seal between the first and second flow control elements 38, 40 with the inlet and outlet seats 58, 60 would block fluid from escaping the cavity 10. In other words, a fluid tight seal in the open position would block pressure relief of a fluid in the cavity 10 as the hot process fluid flows through the gate valve 6 heating and increasing the pressure of the fluid in the cavity 10. Accordingly, the flange 212 blocks contact between the second flow control element 40 and the bonnet 14 and, therefore, prevents the first and second flow control elements 38, 40 from expanding radially outward against the inlet and outlet seats 58, 60 and closing the gaps 8.

In some embodiments, the gate valve 6 may not include a flange 212 that blocks sealing of the cavity 10 when the first and second flow control elements are in an open position. For example, in some embodiments, a width 214 of a second bonnet counterbore 216 may be greater than a width 218 of the first and second flow control elements 38, 40 when coupled together. The width 218 therefore blocks contact between the second flow control element 40 and the bonnet 14, which prevents the first and second flow control elements 38, 40 from expanding into sealing contact with the inlet and outlet seats 58, 60 in an open position. In other embodiments, the second flow control element 40 may define a length 220 that blocks the top surface 90 from contacting the bonnet 14 when the stem 20 is completely threaded into a stem aperture 222 of the first flow control element 40. In another embodiment, the stem aperture 222 may define a depth 224 that blocks contact between the second flow control element 40 and the bonnet 14 when the stem 20 is completely threaded into the stem aperture 222. In still another embodiment, the first and/or second flow control element 38, 40 may include a passage 226 that allows fluid communication between the cavity 10 and the passage 11 through the gate valve 6, when the first and second flow control elements 38, 40 are in an open position. In still another embodiment, the inlet seat contact surface 94 or the outlet seat contact surface 84 may include a groove that enables fluid communication between the cavity 10 and the passage 11 when the first and second flow control elements 38, 40 are in an open position.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
   a valve, comprising:
      a valve body having a chamber and a flow path along a first axis;
      a stem extending along a second axis; and
      a flow control assembly coupled to the stem, wherein the stem is configured to selectively move the flow control assembly through the chamber between a closed position and an open position relative to the flow path, and the flow control assembly comprises:
      a first flow control element; and
      a second flow control element, wherein the first and second flow control elements oppose one another along a cam interface portion having opposite first and second cam surfaces and a diverging portion having opposite first and second surfaces that are angled away from one another to define an expanding space, wherein the expanding space of the diverging portion is open to the chamber, wherein the first and second flow control elements are configured to expand relative to one another via the cam interface portion to create a seal between the chamber and the flow path in the closed position of the flow control assembly, wherein the first and second flow control elements are configured to contract relative to one another to open a gap between the chamber and the flow path in the open position of the flow control assembly.

2. The system of claim 1, wherein the cam interface portion is configured to gradually expand the first and second flow control elements relative to one another as the flow control assembly moves in a first direction from the open position to the closed position, and the first and second flow control elements are not configured to expand relative to one another as the flow control assembly moves in an opposite second direction from the closed position to the open position.

3. The system of claim 2, wherein the opposite first and second cam surfaces of the cam interface portion comprise a first tapered surface of the first flow control element and a second tapered surface of the second flow control element.

4. The system of claim 2, wherein the flow control assembly comprises a biasing structure configured to help contract the first and second flow control elements relative to one another as the flow control assembly moves from the closed position to the open position.

5. The system of claim 4, wherein the biasing structure comprises a spring configured to provide a spring bias in a crosswise direction relative to the second axis of the stem to bias the first and second flow control elements inwardly toward one another.

6. The system of claim 4, wherein the biasing structure comprises a curved guide.

7. The system of claim 6, wherein the curved guide is disposed along a first guide pin on the first flow control element and a second guide pin on the second flow control element.

8. The system of claim 7, wherein the curved guide is disposed along a third guide pin on the first flow control element.

9. The system of claim 6, wherein the curved guide couples together the first and second flow control elements.

10. The system of claim 1, wherein the opposite first and second surfaces of the diverging portion overlap with a first port of the first flow control element and a second port of the second flow control element, and the first and second ports open the flow path in the open position of the flow control assembly.

11. A system, comprising:
   a first flow control element configured to couple to a stem; and
   a second flow control element coupled to the first flow control element, wherein the first and second flow control elements oppose one another along a cam interface portion having opposite first and second cam surfaces and a diverging portion having opposite first and second surfaces that are angled away from one another to define an expanding space, wherein the first and second flow control elements are configured to expand relative to one another via the cam interface portion to create a seal in a closed position between a chamber and a flow path in a valve body, wherein the first and second flow control elements are configured to contract and enable fluid flow between the chamber and the flow path in an open position, wherein the expanding space of the diverging portion is configured to be open to the chamber.

12. The system of claim 11, wherein the first flow control element comprises a first portion with a first angled surface and the second flow control element comprises a second portion with a second angled surface, wherein the first and second cam surfaces of the cam interface portion comprises the first and second angled surfaces, and wherein the first angled surface is configured to engage the second angled surface to expand the first flow control element and the second flow control element to form the seal.

13. The system of claim 11, wherein the opposite first and second surfaces of the diverging portion overlap with a first port of the first flow control element and a second port of the second flow control element, and the first and second ports open the flow path in the open position.

14. The system of claim 11, wherein the second flow control element comprises a truncated first end configured to prevent contact between a bonnet and the second flow control element when the first flow control element is completely retracted within a counterbore of the bonnet.

15. A system, comprising:
   a valve body having a flow path and a chamber;
   a bonnet coupled to the valve body comprising a passage and a flow control element counterbore;
   a stem extending through the passage;
   a first flow control element coupled to the stem; and
   a second flow control element coupled to the first flow control element, wherein the first and second flow control elements oppose one another along a cam interface portion having opposite first and second cam surfaces and a diverging portion having opposite first and second surfaces that are angled away from one another to define an expanding space,
   wherein the expanding space of the diverging portion is open to the chamber, a first port in the first surface of the first flow control element, and a second port in the second surface of the second flow control element,
   wherein the first and second flow control elements are configured to expand relative to one another via the cam interface portion to create a seal in a closed position between the chamber and the flow path in the valve body, and wherein the first and second flow control elements are configured to contract relative to one another to open a gap between the chamber and the flow path in an open position.

16. The system of claim 15, wherein a diameter of the counterbore is greater than the diameter of the first flow control element and the second flow control element when coupled together in the open position.

17. The system of claim 15, wherein a stem aperture in the first flow control element defines a depth configured to prevent contact between the second flow control element and the bonnet when the stem is completely inserted into the stem aperture of the first flow control element.

18. The system of claim 1, wherein the cam interface portion has only one pair of tapered cam surfaces on the respective first and second flow control elements, and the first and second flow control elements are configured to expand relative to one another via only the one pair of tapered cam surfaces of the cam interface portion.

19. The system of claim 1, wherein the opposite first and second surfaces of the diverging portion are acutely angled relative to one another.

20. The system of claim 1, wherein the first surface of the diverging portion is substantially parallel relative to the second axis, and the second surface of the diverging portion is acutely angled relative to the second axis.

21. The system of claim 11, wherein the opposite first and second surfaces of the diverging portion are acutely angled relative to one another.

22. The system of claim 11, wherein the first surface of the diverging portion is substantially parallel relative to an axis of the stem, and the second surface of the diverging portion is acutely angled relative to the axis of the stem.

23. The system of claim 15, wherein the cam interface portion has only one pair of tapered cam surfaces on the respective first and second flow control elements, and the first and second flow control elements are configured to expand relative to one another via only the one pair of tapered cam surfaces of the cam interface portion.

* * * * *